April 1, 1958  W. P. VAN DEN BLINK ET AL  2,829,235
DEVICE FOR USE IN STUD WELDING
Filed Aug. 1, 1955
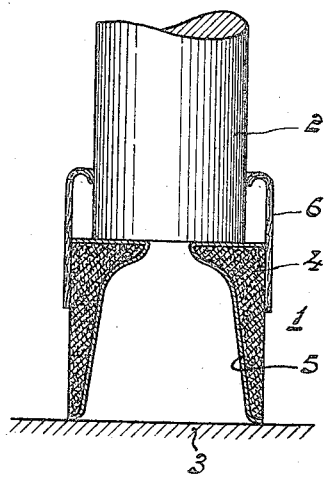
INVENTORS
WILLEM PIETER VAN DEN BLINK
EELKE HERMAN ETTEMA
BY
AGENT

2,829,235

DEVICE FOR USE IN STUD WELDING

Willem Pieter van den Blink and Eelke Herman Ettema, Utrecht, Netherlands, assignors, by mesne assignments, to North American Philips Company, Inc., New York, N. Y., a corporation of Delaware Application August 1, 1955, Serial No. 525,644

Claims priority, application Netherlands August 3, 1954

3 Claims. (Cl. 219—99)

This invention relates to slag-forming bodies used in stud welding. The slag-forming body for use in stud-welding is herein understood to mean the attachment of a metal stud, for example, a bolt with its cross-cut surface to a metal surface by striking an electric arc between the parts to be joined and subsequently pressing these parts together.

In stud-welding, a slag-forming electrically conductive body is provided between the stud end and the metal surface which body has a through-passage accommodating a stud end which is allowed to penetrate to a narrower part.

The use of such a body ensures the desired arc length. Since the member is electrically conductive, the arc is struck upon switching on the welding current and as a result of melting of the narrower part, the body resists pressure exerted on the stud only for such a time as is required for melting a quantity of metal sufficient for establishing the weld.

In order to make the body sufficiently conductive for striking the arc it has been proposed to incorporate metal powder of reduced titanium dioxide. In accordance with the invention, an electrical connection is established between the stud end and the metal surface by providing the passage internally with a metal layer.

The body in accordance with the invention has the advantage that irregularities of the process on account of current transport outside the arc are avoided, since said metal layer disappears immediately after striking the arc so that the body is no longer conductive.

The metal layer may be provided by reducing metal oxides of the slag forming constituents at the surface of the body or by affixing metal foil to the wall of the passage, for example by glazing a strip of foil to its inner wall.

The thickness of the metal layer may vary between wide limits. Thus, for example, excellent results have been obtained with the use of a metal layer 0.003 mm. thick and even 0.7 mm. thick.

The metal layer is preferably provided by depositing metal in the liquid state or in the vapor state, since this method lends itself admirably for mass-production.

In order that the invention may be readily carried into effect it will now be described with reference to the accompanying drawing, given by way of example, which shows in a sectional view a slag-forming body in accordance with the invention.

Referring to the drawing a stud 2 bears on the body 1 which rests on a base 2. In the present case, the body 1 is bipartite and comprises a ring-shaped slag-forming part 4 on the inner half of which and also on the two faces where the body contacts with the two work pieces 2 and 3, a layer 5 of liquid metal is sprayed. The body furthermore comprises a ring 6 of thick paper which permits the body to be clamped to the stud and which, on the occurrence of cracks due to uneven heating by the arc keeps the parts together, and into which the body 1 tends to disintegrate until the end of the welding operation.

The slag-forming part of the body may consist of a mixture of rutile (65%), bentonite (30%) and reducing metal (5%) for example ferromanganese if, in accordance with this method, an iron stud or a stud consisting of an iron alloy (rustless steel) is secured to a plate, the composition of which is the same as that of the stud. Such bodies may, for example, be made by mixing the pulverulent constituents, molding the mixture into the desired form, and subsequently sintering it. Should the metal layer consist of iron or copper, liquid metal is sprayed on it. If aluminum is used, it is preferably deposited on the slag-forming body by vaporization.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A device for use in stud welding comprising a slag-forming body having an opening therein and positioned between said stud and a work-piece, means for clamping said stud on said body whereby said stud is permitted to penetrate through said opening upon the striking of an arc between said stud and said work-piece, and a metal layer on an inner surface of said body thereby establishing electrical contact between said stud and said work piece.

2. A device for use in stud welding as set forth in claim 1 wherein said metal layer is between approximately 0.003 mm. to 0.7 mm. thick.

3. A device for use in stud welding comprising a bipartite, ring-shaped slag-forming body having an opening therethrough, said body supporting the stud a certain fixed distance from a work-piece, a cardboard ring secured to said body for clamping said stud on said body whereby said stud is permitted to penetrate through said opening upon the striking of an arc between said stud and said work-piece, and a metal layer on an inner surface of said ring-shaped body thereby establishing electrical contact between said stud and said work-piece.

References Cited in the file of this patent

UNITED STATES PATENTS

| | | |
|---|---|---|
| 2,459,957 | Palmer | Jan. 25, 1949 |
| 2,509,999 | Willigen et al. | May 30, 1950 |
| 2,510,000 | Willigen et al. | May 30, 1950 |

FOREIGN PATENTS

| | | |
|---|---|---|
| 640,591 | Great Britain | July 26, 1950 |